United States Patent [19]

Ironside

[11] 4,142,483
[45] Mar. 6, 1979

[54] OPERATION TIMING CONTROL SYSTEM FOR AN INTERNAL COMBUSTION ENGINE

[75] Inventor: John M. Ironside, Birmingham, England

[73] Assignee: Lucas Industries Limited, Birmingham, England

[21] Appl. No.: 804,308

[22] Filed: Jun. 7, 1977

[30] Foreign Application Priority Data

Jun. 16, 1976 [GB] United Kingdom ............... 24916/76

[51] Int. Cl.$^2$ ............................. F02B 3/00; F02P 5/04
[52] U.S. Cl. ............................. 123/32 EB; 123/32 EC; 123/117 D
[58] Field of Search ........ 123/32 EA, 32 EB, 32 EC, 123/117 R, 117 D, 148 E

[56] References Cited

U.S. PATENT DOCUMENTS

| | | | |
|---|---|---|---|
| 3,752,139 | 8/1973 | Asplund | 123/117 D X |
| 4,034,720 | 7/1977 | Noguchi et al. | 123/32 EB X |
| 4,063,539 | 12/1977 | Gorille et al. | 123/32 EB X |
| 4,068,631 | 1/1978 | Lombard et al. | 123/32 EC X |

FOREIGN PATENT DOCUMENTS 2522430  12/1975  Fed. Rep. of Germany ...... 123/117 D
2289744  5/1976  France .............................. 123/32 EB

*Primary Examiner*—Charles J. Myhre
*Assistant Examiner*—Tony M. Argenbright

[57] ABSTRACT

An internal combustion engine operation timing control uses a programmed read only memory to produce a multibit digital signal used to determine the instant of operation. There are two inputs to the ROM, one of which is from a speed counter and the other of which is from another engine parameter transducer. The digital output of the ROM is applied to a timing counter for conversion to a time duration by clocking out timing pulses. The same master clock is used for clocking both the speed counter and the timing counter, a frequency divider programmed in accordance with the 3MSBs of the speed counter is used to reduce the clock frequency as the count in counter increases during speed computation, the same divisor remaining in action during the timing operation.

3 Claims, 6 Drawing Figures

OPERATION TIMING CONTROL SYSTEM FOR AN INTERNAL COMBUSTION ENGINE

This invention relates to operation timing control systems for use in internal combustion engines, particularly fuel injection control systems for diesel engines or ignition control systems for petrol engines.

The present invention is particularly concerned with the use in such a system of an empirically programmed read only memory as part of an electronic operation timing control system. Such memories, the use of which has previously been proposed for use in such engine management applications as petrol engine fuel injection metering controls are particularly suited to engine management since it is a relatively simple matter to programme such a memory with a very complex function of two independent variables, which would be very difficult if not impossible to obtain using conventional analogue computation circuits. In a timing control system of such a form, the output from the memory represents the position in the engine cycle when the fuel is to be injected or the spark is to be produced, and signals representing the instantaneous angular position of the engine crankshaft are compared with the memory output, and when the two are coincident the fueling or sparking is initiated.

Typically, the timing control for injection of fuel into a diesel engine, or the initiation of a spark in a petrol engine will be required to give good angular resolution ($\pm \frac{1}{4}°$) over a wide range of operating speeds (e.g. 300 to 3000 r.p.m.). One obvious way of providing a digital speed input signal to the memory would be to count the number of clock pulses occurring between two marker pulses produced by a transducer driven by the engine. With such an arrangement, however, a given change in the count at the high speed end of the speed range would represent a speed change 100 times greater than the same change in the count at the low speed end. This would mean that efficient use of the storage capacity of the memory would be impossible since the total number of memory addresses required would have to be selected to give the required resolution at the high speed end of the speed range, and a resolution at the low speed end would be much higher than needed.

Similarly, one way of providing a digital signal representing angular position of the engine crankshaft is to count the number of clock pulses from a marker pulse produced by a transducer driven by the engine; conveniently the same transducer which produces the two marker pulses for speed measurement. However, as with the speed measurement explained above a given change in the count at the high speed end of the angle measuring range would represent an angle change 100 times greater than the same change in the count at the low speed end. This would also lead to inefficient use of the memory.

It is an object of the present invention to provide a system in which the efficiency of utilisation of the memory is improved.

An operation timing control system for an internal combustion engine in accordance with the invention comprises an engine shaft position transducer driven by the engine and producing a train of pulses each marking a specific angular position of the engine shaft, a fixed frequency clock pulse generator, a counter for counting pulses from the clock pulse generator, an empirically programmed digital read only memory having one set of input terminals connected to said counter, a further set of input terminals connected to a further transducer circuit associated with the engine, and a set of output terminals, an output circuit connected to the output terminals of the memory and a control circuit connecting the clock to the counter and the output circuit and also connected to the transducer whereby the counter is clocked by the clock pulse generator for a part of the cycle determined by the transducer and the output circuit is clocked by the clock pulse generator for another part of the operating cycle, characterised in that the control circuit includes a programmable frequency dividing circuit connected to the clock pulse generator and having divisor control input terminals connected to selective output terminals of the counter, whereby during said one part of the operating cycle the frequency at which the counter is clocked is varied in accordance with the count state of the counter and during said other part of the operating cycle the output circuit is clocked at a fixed frequency determined by the count state of the count state of the counter at the end of said one part of the operating cycle.

Figure 1:
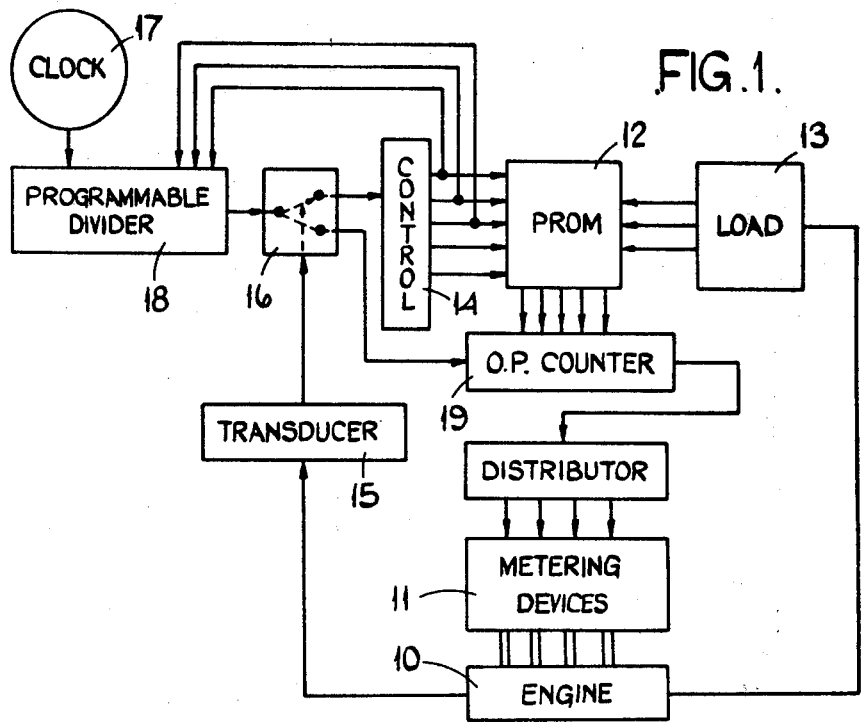
FIG. 1 is an overall block diagram of an example of a diesel engine fuel injection control system in accordance with the invention.

Referring firstly to FIG. 1 the system for a four cylinder diesel engine 10 includes four fuel metering devices 11 associated respectively with injectors for the four cylinders of the engine. These devices are not described in detail herein, nor is the part of the control which signals the instant when charging of each metering device can begin. The present invention is concerned exclusively with an arrangement included in the system for controlling the exact instant for releasing the charges of fuel from the metering devices.

An empirically programmed read only memory 12 receives input signals from a lead transducer 13 and from a speed counter 14, the count in the counter 14 being stored in the counter between two markers supplied by the shaft position transducer 15 when the transducer 15 allows an electronic two-way switch 16 to connect a fixed frequency clock 17 to the counter 14 via a programmable divider 18 (whose function will be explained later). After the speed count has been made the transducer 15 causes the two-way switch 16 to connect the clock 17 to an output counter 19 via the programmable divider 18 (again whose function will be explained later). The output counter 19 will have a count provided by the memory 12 appropriate to the frequency at which the pulses are arriving at the output counter 19, such that when the clock pulses commencing from a marker supplied from the transducer 15 equal the number stored in output counter 19 the metering devices 11 which contain the metered quantities of fuel, are allowed to inject into the engine 10.

As has been explained, if the clock 17 were allowed to feed the speed counter 14 without modification between two markers on the angle transducer 15 over the full speed range, an unnecessarily large memory would be needed to give the required resolution over such speed range. To overcome this problem selective information from the speed counter 14 address to the memory 12 is used to programme the divider 18 whereby at low speeds a higher divisor is used than at the high speeds, and to ensure more efficient use of the memory 12.

Similarly, as has been explained, an unnecessarily large memory would be required if the output counter 19 were to receive information representing the number of pulses required to initiate injection if counted at a constant rate over the full speed range, since a small number of pulses from the transducer 15 marker at high speed could represent the same engine angular movement as a much larger number of pulses from the same marker at low speed, i.e. angular resolution at low speeds would be much better than that at high speeds. To overcome this problem the divisor as determined by selective memory address from the speed counter 14, is caused to divide the clock frequency when the transducer 15 allows the two-way switch 16 to connect the clock 17 to the output counter 19, and so provide a more uniform resolution of angle over the full speed range.

Figure 2:
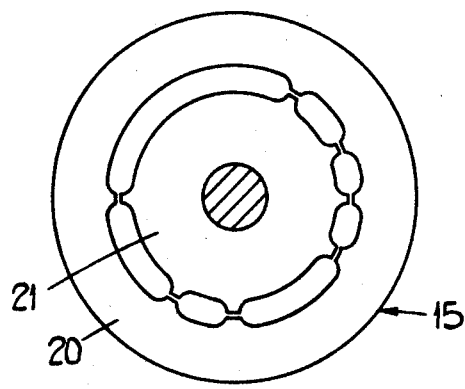
FIG. 2 is a diagrammatic view of part of a shaft position transducer forming a part of the system of FIG. 1.
Figure 2A:
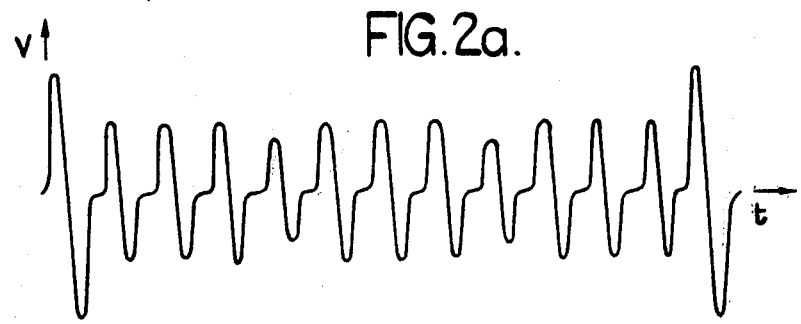
FIG. 2a is a diagrammatic graph showing the output of the transducer of FIG 2.
Figure 3:
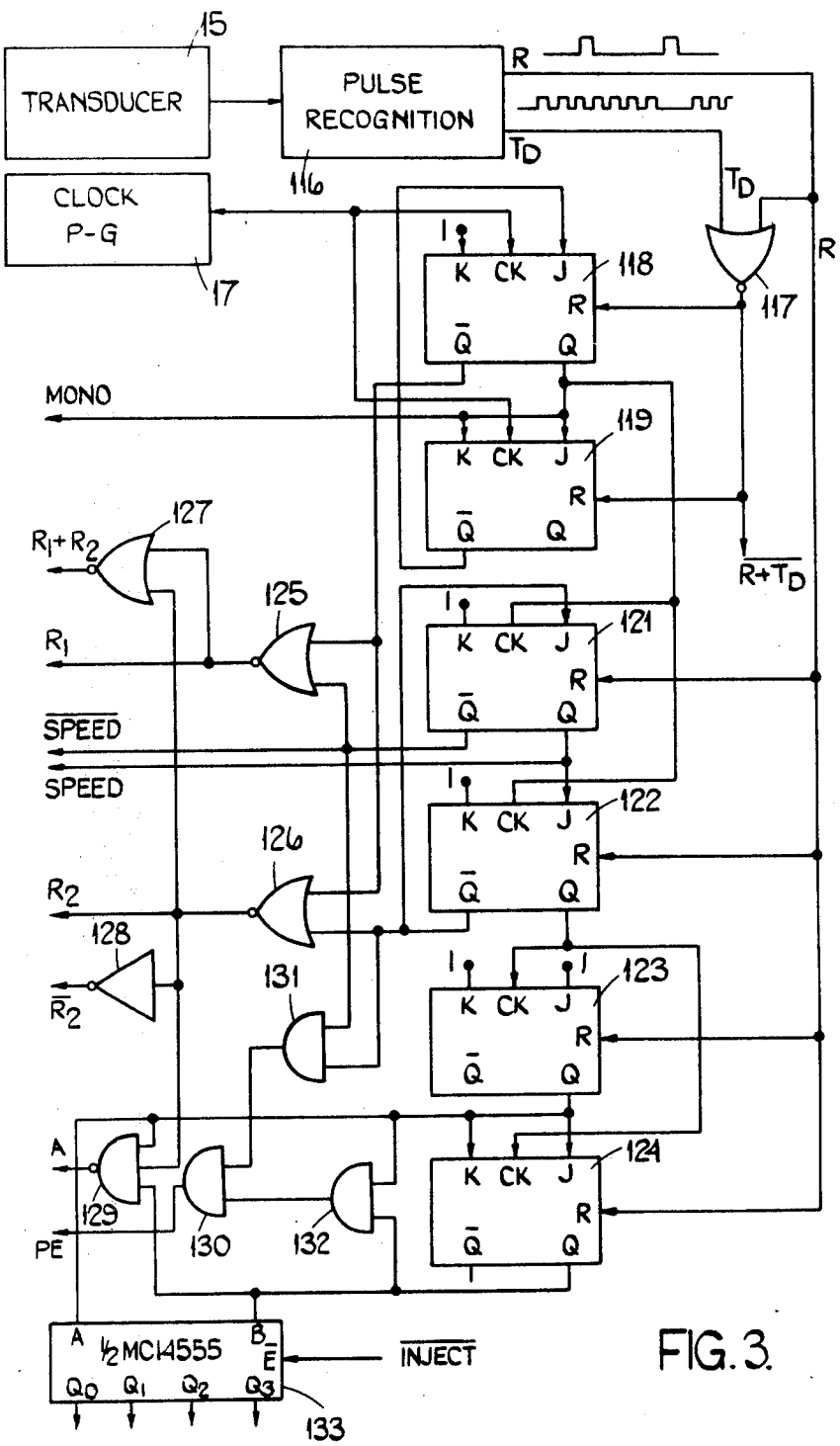
FIG. 3 is a block diagram of a control logic circuit of the system.

The shaft position transducer is generally as described in my continuation Patent Application U.S. Ser. No. 870,988 filed January 20, 1978 and is electromagnetic. As shown in FIG. 2 the transducer has a stator 20 with poles at the 1, 2, 3, 4, 6, 7 and 9 o'clock positions but no poles at the 5, 8, 10, 11 and 12 o'clock positions and a rotor 21 with a similar pole arrangement. The transducer includes a permanent magnet and a pick-up coil and, as explained in more detail in the aforesaid Application Ser. No. 870,988 produces output pulses when the rotor 21 is rotated, each pulse having a positive going part and a negative going part. The heights of the pulses vary as shown in FIG. 2a, with one large pulse per revolution of the rotor and eleven much smaller pulses. In fact two of the eleven smaller pulses are slightly smaller than the remainder, but this is not significant. As shown in FIG. 3 the transducer 15 is followed by a pulse recognition circuit 116 arranged to distinguish between the single larger pulse and the remaining eleven pulses in the manner generally described in Application Ser. No. 870,988. The single pulse appears at a terminal R and the remaining eleven at a terminal $T_D$.

In the following description all the gates, flip-flops, etc. are Motorola CMOS integrated circuits.

FIG. 3 mainly embodies devices for producing short, clock synchronous reset pulses at each transducer pulse, the transducer position counter and various gates for producing certain reset pulses only at particular states of the transducer.

The control logic of FIG. 3 includes a NOR gate 117 (¼ MC 14001) which has two inputs connected to the R and $T_D$ terminals respectively and so produces a logic output signal $\overline{R + T_D}$. The output of the NOR gate 117 is connected to the RESET terminals of two JK type flip-flops 118, 119 (each ½ MC 14027). The CLOCK terminals of these two flip-flops are connected to the clock pulse generator 17 operating at a high frequency e.g. about 250 KHz. The J input terminal of flip-flop 118 is connected to the $\overline{Q}$ output terminal of flip-flop 119 and the K input terminal of flip-flop 118 is connected to a fixed logic 1 input. The J and K input terminals of the flip-flop 119 are connected to the Q output terminal of the flip-flop 118 which is also connected to an output terminal labelled MONO.

The flip-flops 118, 119 generate a train of output signals at the MONO output terminal, each output signal commencing at a positive-going edge of each R or $T_D$ signal and having a duration of 4 μS.

A second pair of JK flip-flops 121, 122 (each ½ MC 14027) have their RESET terminals connected to the R rail and their CLOCK input terminals connected to the Q output terminal of flip-flop 118. The J input terminal of flip-flop 121 is connected to the $\overline{Q}$ output terminal of flip-flop 122 and the J input terminal of flip-flop 122 is connected to the Q output terminal of the flip-flop 121.

Effectively the flip-flops 121, 122 form a counter counting the three segments of each quadrant of the operating cycle. At the end of each cyle both flip-flops are reset by the R pulse and each successive MONO pulse clocks the flip-flops 121, 122.

The Q and $\overline{Q}$ output terminals of the flip-flop 121 are connected to SPEED and $\overline{SPEED}$ output terminals respectively and are used, as will be explained hereinafter, to control the speed measuring portion of the cycle.

A third pair of flip-flops 123, 124 (each ½ MC 14027) are used for counting the quadrants. Each has its RESET terminal connected to the R rail and its CLOCK terminal connected to the Q output terminal of the flip-flop 122. The J and K input terminals of the flip-flop 123 are connected to a logic 1 input and the J and K input terminals of the flip-flop 124 are both connected to the Q output terminal of the flip-flop 123.

The control logic circuit also includes an array of gates (which are all various Motorola CMOS gates of unspecified type) for producing, reset and other control pulses. Firstly, a NOR gate 125 has inputs from the $\overline{Q}$ output terminals of flip-flops 119 and 121. This produces an $R_1$ reset pulse immediately after the first, fourth, seventh and tenth $T_D$ pulses after each R pulse. A NOR gate 126 has inputs from the $\overline{Q}$ outputs of flip-flops 118 and 122. This produces an $R_2$ reset pulse immediately following the second, fifth, eighth and eleven $T_D$ pulses after each R pulse. An OR gate 127 with inputs from the NOR gates 125 and 126 produces a train of pulses $R_1 + R_2$. An inverter 128 provides a $\overline{R_2}$ output. A NAND gate 129 has input from the Q output terminals of the flip-flops 123 and 124 and a further input from the NOR gate 126. This produces an A pulse immediately following the second $T_D$ pulse after each R pulse. An AND gate 130 has input from two further AND gates 131 and 132. Gate 131 has inputs from the $\overline{Q}$ output terminals of the flip-flops 121 and 122 and the gate 132 has inputs from the Q output terminals of flip-flops 123 and 124. The gate 130 produces a PE output for the period between the third and fourth $T_D$ pulses after each R pulse. The A and PE outputs are not used in the following circuit, but in a circuit described in my co-pending Application U.S. Ser. No. 804,309 relating to the metering timing system.

Distribution is achieved using a 1-to-4 decoder 133 (¼ MC 1455). The A and B input terminals of the decoder 133 are connected to the Q output terminals of the flip-flop 123 and 124 respectively and the $\overline{E}$ input terminal is connected to an $\overline{INJECT}$ terminal (from FIG. 5). The $Q_0$, $Q_1$, $Q_2$ and $Q_3$ output terminals of the decoder 133 are connected to the inject input terminals of the four metering devices.

Figure 4:
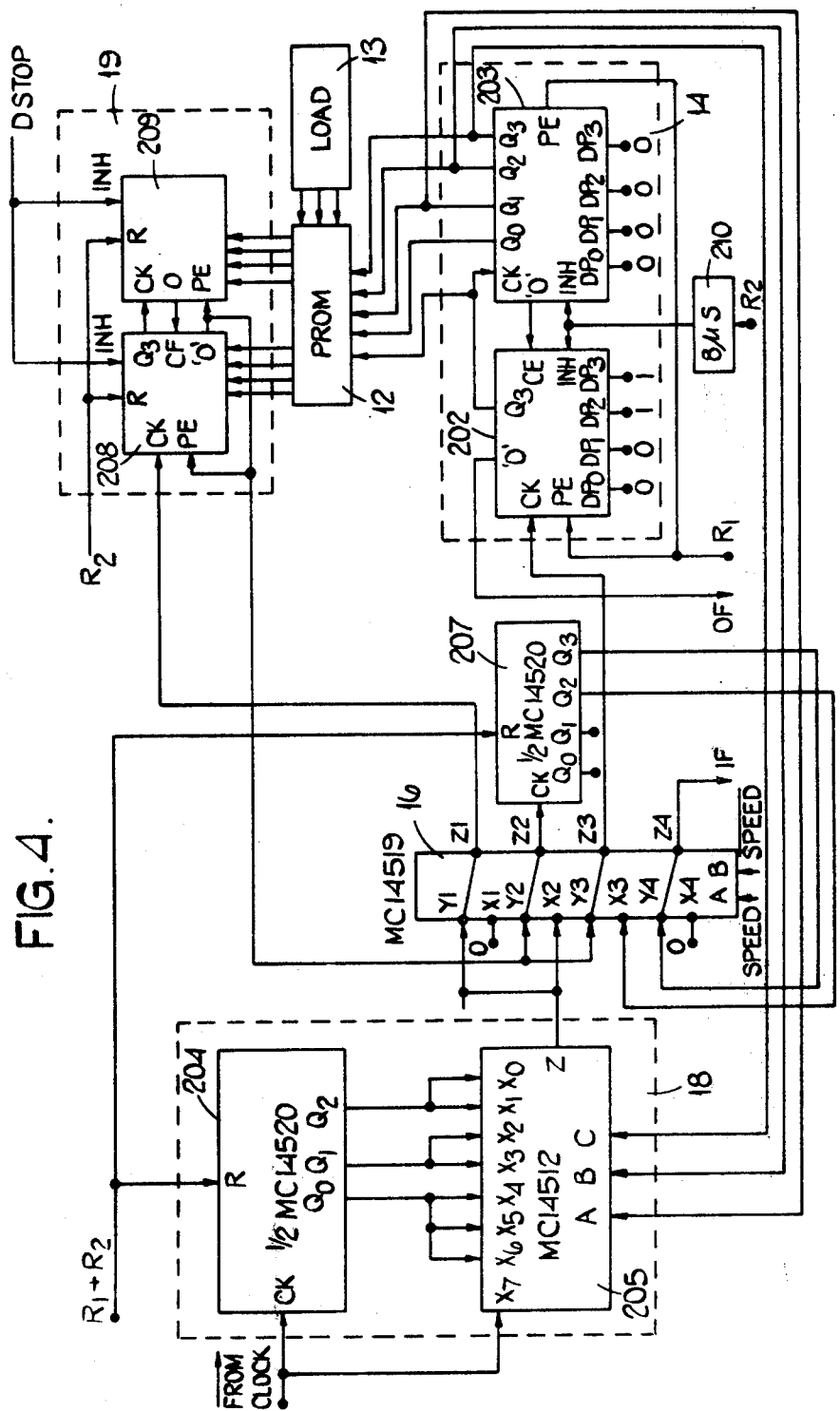
FIG. 4 is a block diagram of a timing control circuit of the system.

Turning now to FIG. 4 there is shown therein the part of the circuit responsible for generating a digital speed signal, the memory 12 which is addressed by the speed signal and by a digital signal from the load transducer 13, and the part of the circuit responsible for determining the instant of injection in accordance with the output of the memory.

The speed signal generating circuit includes the programmable frequency divider 18 through the intermediary of which clock pulses are counted into the counter 14 (consisting of circuits 202, 203) for the period whilst the SPEED output is high (i.e. in the second segment of each quadrant). The programmable frequency divider 18 is actually made up of two integrated circuits namely a counter 204 ($\frac{1}{2}$ MC 14520) and a 1-of-8 data selector (MC 14512). The counter 204 has its CLOCK input terminal connected to the clock pulse generator and its RESET input terminal connected to the $R_1 + R_2$ line. The $Q_0$, $Q_1$ and $Q_2$ output terminals provide pulse trains at respectively one half, one quarter and one eighth of the clock pulse frequency.

The selector 205 is such that the signal at its Z output terminal will be the same at the signal at its $X_0$, $X_1$ ... or $X_7$ input terminal according to the combination of signals present at its A, B and C input terminals. The $X_0$ and $X_1$ inputs of the selector 205 are connected to the $Q_2$ output of the counter 204, its $X_2$ and $X_3$ input terminals are connected to the $Q_1$ output terminal, its $X_4$, $X_5$ and $X_6$ input terminals are connected to the $Q_0$ output terminal and the $X_7$ input terminal is connected to the clock pulse generator. The output at terminal Z is thus at the clock frequency for an input at CBA of 111, at one half of the clock frequency for inputs of 110, 101 and 100, at one quarter of the clock frequency for inputs of 011 and 010 and at one eighth of the clock frequency for inputs of 001 and 000.

The Z output terminal of the selector 205 is connected to the $Y_1$ and $X_2$ input terminals of a four pole two way CMOS switch device 16 (MC 14519). The A and B control input terminals of the switch device 16 are connected respectively to the SPEED and $\overline{\text{SPEED}}$ output terminals of the control logic circuit of FIG. 3. The $Z_2$ output terminal of the switch device 16 is connected to the CLOCK terminal of a counter 207 ($\frac{1}{2}$ MC 14520) which has its RESET terminal connected to the $R_1 + R_2$ line. The $Q_2$ and $Q_3$ output terminals of this counter are connected respectively to the $X_3$ and $Y_4$ input terminals of the switch device 16. The $Y_2$ and $Y_3$ input terminals of the device 16 are connected to an output of a counter 19 (consisting of counter circuits 208, 209 yet to be described) and the $Z_1$ and $Z_3$ outputs of the device 16 provide clocking pulses to the counter 208, 209 and 202, 203 respectively. The $Z_4$ output terminal of the device 206 is connected to an $I_F$ output which goes to FIG. 5.

The device 16 varies the connections between the output of the frequency divider 18; the counters 207; 208 and 209; and 202 and 203; and the terminal $I_F$ according to the signals on the SPEED and $\overline{\text{SPEED}}$ inputs. In the stage of operation when the SPEED input is high, there is no output to $I_F$ or to the counter 208, 209 (the $X_1$ and $X_4$ terminals being at logic 0) and the output Z of the divider 18 is routed via the switch device 16 ($X_2 Z_2$) to the counter 207 which acts as a divide by 8 circuit ($Q_2$ output) and thence via the switch device ($X_3 Z_3$) to the counter 202, 203 (14). In the stage where the $\overline{\text{SPEED}}$ input is high, the output Z of the divider 18 goes via the switch device 16 ($Y_1 Z_1$) to the counter 208, 209 (19), the output of which goes via the device 16 ($Y_2 Z_2$) to the counter 207 which acts as a divide by 16 circuit and also through the device ($Y_3 Z_3$) to the counter 202, 203 (14). The $Q_3$ output from the counter 207 goes via the device 16 ($Y_4 Z_4$) to the output terminal $I_F$.

The counter 202, 203 (14) consists of two four bit counters (each MC 14526). These have their COUNT INHIBIT terminals connected via an 8 $\mu$S monostable circuit 210 to the $R_2$ output of the circuit of FIG. 3. The PRESET ENABLE terminals of the two counters are connected to the $R_1$ output of the circuit of FIG. 3. The 0 output terminal of counter 202 is connected to an $O_F$ output terminal (which goes to FIG. 5). The CLOCK input terminal of the counter 202 is connected to the $Z_3$ terminal of the device 16. The $Q_3$ output terminal of the counter 202 is connected to the CLOCK terminal of the counter 203 and also to the LSB input to the memory matrix 12. The $Q_0$, $Q_1$, $Q_2$ and $Q_3$ output terminals of the counter 203 are connected to the remaining speed address input terminals of the memory matrix, which is an empirically programmed read only memory matrix of known form consisting of an array of diodes providing connections between selective ones of the input and output terminals. The two counters 202, 203 have eight DATA PRESET input terminals which are connected as shown to provide logic 1 on each of the $DP_2$ and $DP_3$ terminals of the counter 202 and logic 0 on the rest. The 0 output terminal of the counter 203 is connected to the CF input terminal of the counter 202.

Figure 5:
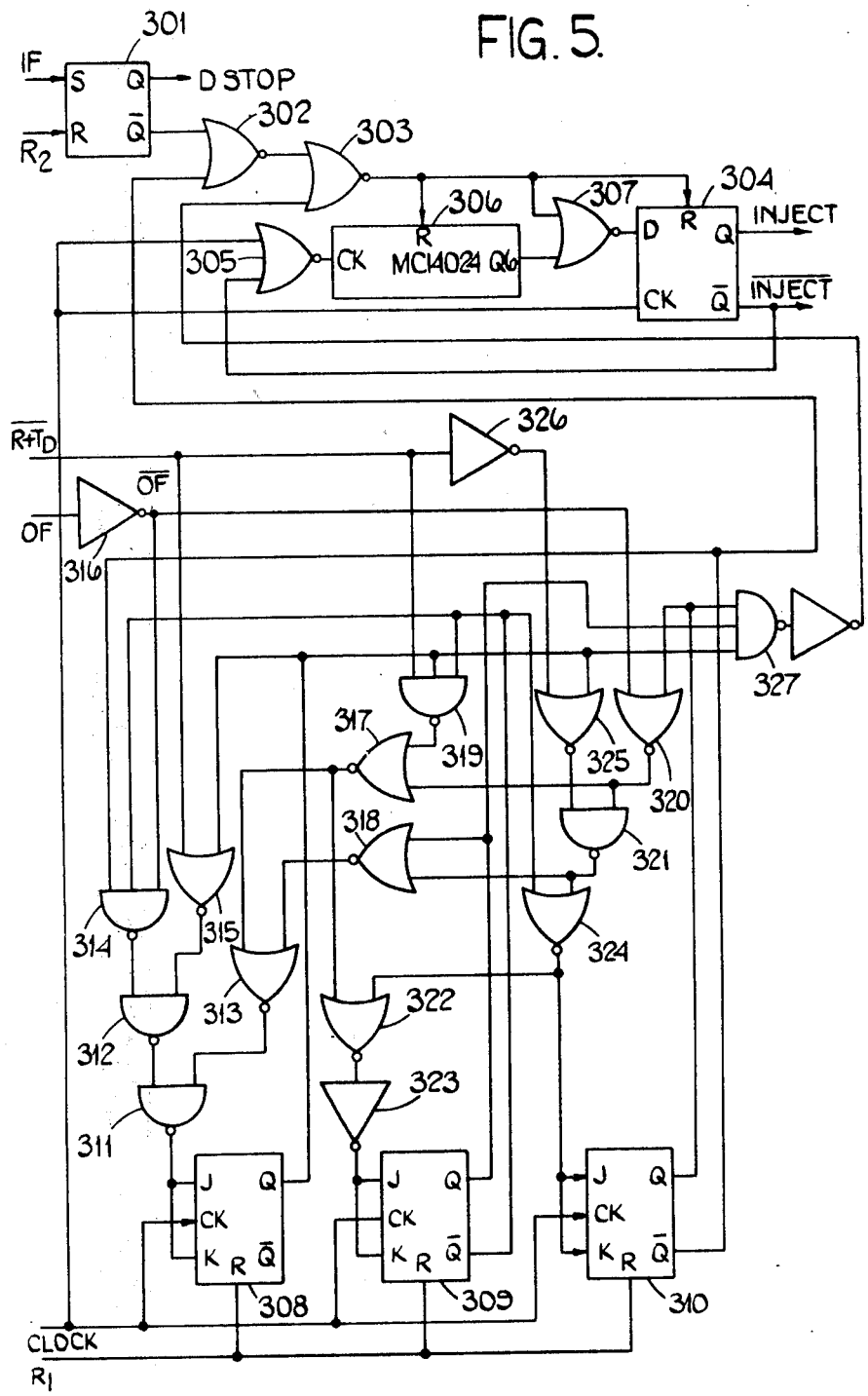
FIG. 5 is a block diagram of an output logic circuit of the system.

The counter 208, 209 (19) again consists of two four bit counters (both MC 14526) in cascade, the INHIBIT terminals of which are connected to a DSTOP output (from FIG. 5). The $Z_1$ output terminal of the switching device 16 is connected to the CLOCK input terminal of the counter 208 and the $Q_3$ output terminal of the counter 208 is connected to the CLOCK input terminal of the counter 209. The reset terminal of each counter is connected to the $R_2$ line and the PRESET ENABLE terminal of each counter is connected to the 0 output terminal of the counter 208, the 0 output terminal of the counter 209 being connected to the CF terminal of the counter 208. It is the 0 output terminal of the counter 208 which is connected to the $Y_2$ and $Y_3$ terminals of the device 16. The eight DATA PRESET terminals of the counters 208, 209 are connected to the eight output terminals of the memory device 12.

The circuit shown in FIG. 4 operates as follows: an $R_1$ pulse resets the counters 204 and 207 to zero and presets the counters 202, 203 to 00110000. The SPEED signal sets switch device 16 as described above to deliver clock pulses via the divider 18 and the counter 207 (operating as a divide by eight circuit) to the counter 202, 203 which is set up to count down. At this stage the three MSB signals are 000 and the divider 18 therefore operates to divide by eight. The total division is thus by 64 and the time taken to count out 13 pulses to reach the state 11111111 is about $3\frac{1}{3}$ mS which corresponds to the time between two successive $T_D$ pulses at the maximum engine speed catered for of 3000 r.p.m. At lower speeds the count will pass through 11111111 and continue downwards until stopped by the end of the SPEED pulse. At 11111111 the divider 18 switches so that counting proceeds at one eighth of the full clock frequency, until the count falls to 11011111 when the divider switches to provide pulses for counting at one sixteenth of the clock frequency down to 10000000, at one thirty-second of the clock frequency from 0111111 to 0100000 and at one sixty-fourth of the clock frequency from 00111111 to 00000000. In this way a relatively even spread of speeds across the available speed addresses of the memory is obtained.

At the end of the SPEED pulse, the $R_2$ signal resets counters 204, 207, 208 and 209. Counters 208, 209 then preset to the value outputted by the memory 12. The monostable circuit 210 ensures that the counters 202, 203 are inhibited during such resetting so that the counters 202, 203 are not clocked by the 0 pulse from counter 208 which occurs on resetting and which is routed to counter 202 via switch device 16 ($Y_3 Z_3$). Output counting then commences, with clock pulses fed to the counter 208 at a frequency eight times greater than that at which the counter 202 was being clocked at the end of the SPEED period, since counter 207 is now omitted. When the counter 208, 209 reaches 00000000 the output pulse from the counter 208 '0' output terminal will be routed to the counter 207 and to the counter 202. The change in count in the counter 202 will only have an effect on the next count cycle if the three least significant bits in the counter 202 were 000 i.e. if the count was XXXXX000 where X is 1 or 0. The LSB of the input to the memory will then be reduced by one and the output of the memory would change. The counters 208, 209 are preset again to the existing memory output and another count cycle proceeds, the counter 207 being clocked once. It will be appreciated that altogether this cycle occurs eight times before an output appears from the $Q_3$ terminal of counter 207 which stops the count as described with reference to FIG. 5. Only if the lower three bits of counter 202 start at 111 will the memory speed input be the same for all eight cycles. Otherwise one of the pulses from the '0' terminal of counter 208 will cause the LSB of the memory speed input to be reduced by one so that the proportions of the total number of cycles at the two different memory speed inputs will vary in accordance with the initial value of the three LSB's of the counter 202, giving a form of interpolation to give improved accuracy for the same number of memory speed addresses.

It will be noted that the output time delay from the $R_2$ pulse depends not only on the memory output (which is an empirically determined function of the speed input) but also the actual value of the three MSBs of the speed input. This means that the actual dynamic range of the memory can be much compressed thereby enabling very efficient use of the memory matrix to be used.

FIG. 5 shows a circuit for detecting underspeed operation of the engine. If this is detected it inhibits the normal timed injection, and substitutes injection at a static position. In either case a pulse stretching circuit is used to give a longer output pulse (64 clock periods).

In FIG. 5 the $I_F$ output terminal (i.e. the $Z_4$ terminal) of the device 16, is connected to the SET input terminal of an R-S flip-flop circuit 301 which is reset by the $R_2$ signal. The Q output terminal of this circuit 301 is connected back to the DSTOP input terminal of FIG. 4. The $\overline{Q}$ output terminal on the other hand is connected to one input terminal of a NOR gate 302, the output terminal of which is connected to one input terminal of a NOR gate 303. The output terminal of a NOR gate 303 is connected to the RESET terminal of a D-type flip-flop circuit 304.

The $\overline{Q}$ output terminal of the flip-flop circuit is connected to an $\overline{\text{INJECT}}$ terminal (see FIG. 3). The $\overline{Q}$ terminal of the circuit 304 is also connected to one input terminal of a NOR gate 305 which has another input terminal connected to the clock pulse generator. The output terminal of the gate 305 is connected to the CLOCK terminal of a counter 306 (MC 14024) which has its RESET terminal connected to the output terminal of the gate 303. The $Q_6$ output terminal of the counter 306 is connected to one input terminal of a NOR gate 307 with its other input terminal connected to the output terminal of the gate 303 and its output terminal connected to the D input terminal of the circuit 304. The CLOCK terminal of the circuit 304 is connected to the clock pulse generator.

The logic circuit of FIG. 5 also has inputs from the $\overline{R + T_D}$ line (FIG. 3), the OF (FIG. 4) and the $R_1$ line (FIG. 3). The $R_1$ line is connected to the RESET input terminals of three JK-type flip-flop circuits 308, 309 and 310. These circuits 308, 309, 310 have their CLOCK terminals connected to the clock pulse generator. The J and K input terminals of the circuit 308 are both connected to the output terminal of a NAND gate 311 which has one input from a NAND gate 312 and one from a NOR gate 313. The NAND gate 312 has one input from a NAND gate 314 and one from a NOR gate 315. The NAND gate 314 has inputs from the OF terminal via a logical inverter 316 and from the $\overline{Q}$ output terminals of the circuit 309 and 310. The gate 315 has inputs from the $\overline{R + T_D}$ line and from the Q output terminal of the circuit 308.

The gate 313 has inputs from the output terminals of two NOR gates 317 and 318. The gate 317 has inputs from a NAND gate 319 and from a NOR gate 320. The gate 318 has inputs from the Q output terminal of the circuit 309 and from the output terminal of a NAND gate 321. The output terminal of the NOR gate 317 is connected to one input terminal of a NOR gate 322, the output terminal of which is connected via a logical inverter 323 to the J and K input terminals of the circuit 309. The NAND gate 319 has inputs from the $\overline{R + T_D}$ line, from the $\overline{Q}$ output terminal of the circuit 308 and from the Q output terminal of the circuit 309. The NOR gate 322 has another input terminal connected to the output terminal of a NOR gate 324 which is also connected to the J and K input terminals of the circuit 310. The gate 324 has inputs from the gate 321 and from the $\overline{Q}$ output terminal of the circuit 309.

The NAND gate 321 has one input from the gate 320 and another from a NOR gate 325 which has one input from the Q output terminal of the device 308 and another from the $\overline{R + T_D}$ line via an inverter 326. The gate 320 has one input from the inverter 316 and another from the Q output terminal of the device 310.

The $\overline{Q}$ output terminal of the device 310 is connected to one input of the gate 302 and the Q output terminal thereof is connected to one input terminal of a NAND gate 327 which also has inputs from the Q output terminals of circuits 308 and 309. The output terminal of the gate 327 is connected via an inverter 328 to an input terminal of the gate 303.

Clearly the logic circuit of FIG. 5 is complex and no attempt will be made herein to explain its operation in detail. Suffice it to say that it is required to be brought into operation by each "0" pulse from the counter 202 and then detect whether the next "0" pulse arrives before or after the following $T_D$ pulse. Should the second "0" pulse arrive before the $T_D$ pulse the following $T_D$ pulse provides the injection timing pulse to the metering device instead of the $I_F$ pulse from the counter 207. This insures that for all engine speeds lower than the range for which data is stored in the memory 201 injection occurs at top dead centre for the cylinder concerned instead of up to 30° before top dead centre. Although complex, the circuit of FIG. 5 is cheaper than the extra circuitry which would be required to extend the speed range of the memory down to the cranking speed of the engine.

While the particular example described above has shown the invention applied to controlling the instant in a diesel engine cycle when fuel is injected, it will be appreciated that the circuits apply equally to the controlling of spark initiation in petrol engines.

I claim:

1. An operation timing control system for an internal combustion engine comprising an engine shaft position transducer driven by the engine and producing a train of pulses each marking a specific angular position of the engine shaft, a fixed frequency clock pulse generator, a counter for counting pulses from the clock pulse generator, an empirically programmed digital read only memory having one set of input terminals connected to said counter, a further set of input terminals connected to a further transducer circuit associated with the engine, and a set of output terminals, an output circuit connected to the output terminals of the memory and a control circuit connecting the clock to the counter and the output circuit and also connected to the transducer whereby the counter is clocked by the clock pulse generator for a part of the cycle determined by the transducer and the output circuit is clocked by the clock pulse generator for another part of the operating cycle, characterised in that the control circuit includes a programmable frequency dividing circuit connected to the clock pulse generator and having divisor control input terminals connected to selective output terminals of the counter, whereby during said one part of the operating cycle the frequency at which the counter is clocked is varied in accordance with the count state of the counter and during said other part of the operating cycle the output circuit is clocked at a fixed frequency determined by the count state of the counter at the end of said one part of the operating cycle.

2. An operation timing control system as claimed in claim 1 in which said selective output terminals of the counter are the most significant bit output terminals of the counter.

3. An operation timing control system as claimed in claim 1 in which the programmable frequency dividing circuit comprises the combination of a binary counter and a data selector having its data input terminals connected to selected ones of the stage outputs of the binary counter.

* * * * *